April 18, 1950    D. I. STEPACOFF ET AL    2,504,749
COUPLING FOR EYEGLASSES
Filed Jan. 25, 1949
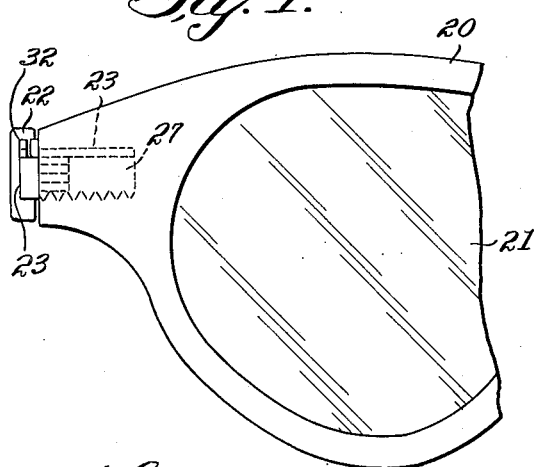
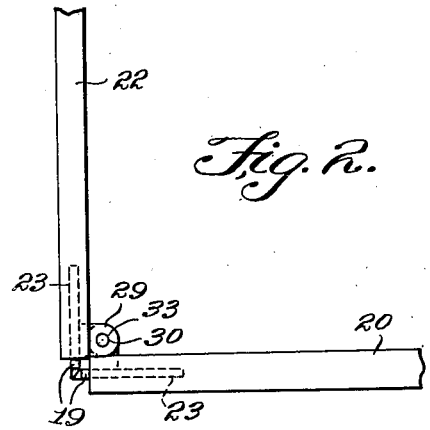
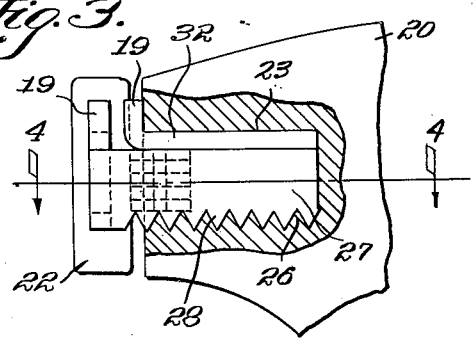
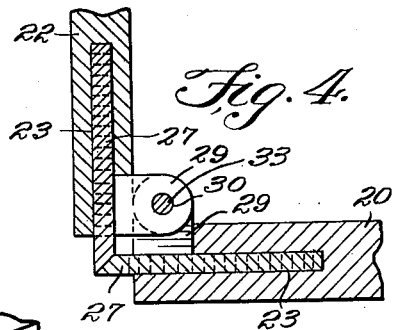
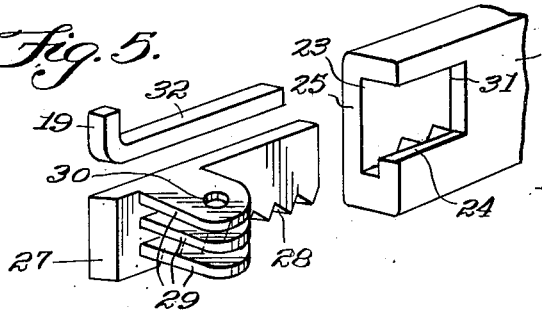
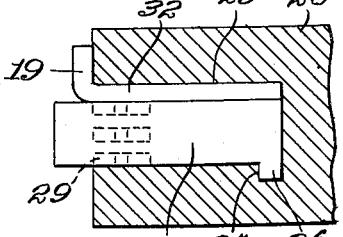
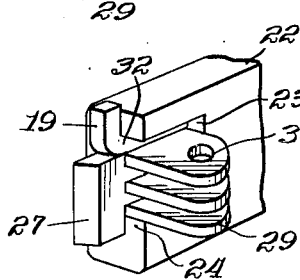
INVENTOR.
Peter C. Smith,
David I. Stepacoff,
BY Victor J. Evans & Co.
ATTORNEYS Patented Apr. 18, 1950

2,504,749

UNITED STATES PATENT OFFICE 2,504,749

COUPLING FOR EYEGLASSES

David I. Stepacoff and Peter C. Smith, Perth Amboy, N. J.

Application January 25, 1949, Serial No. 72,732

1 Claim. (Cl. 88—53)

This invention relates to a coupling, and more particularly to a hinge connection or coupling for connecting the temple piece to the frame of eyeglasses.

The object of the invention is to provide a coupling for hingedly connecting two members together.

The object of the invention is to provide a coupling for eyeglasses whereby the temple pieces can be readily attached and detached from the frame of the eyeglasses.

Another object of the invention is to provide a hinge connection for eyeglasses which is simple in its construction and arrangement, strong, desirable and efficient in its use, compact, attractive in appearance, and comparatively inexpensive to manufacture.

Other objects and advantages will be apparent in the course of the following description.

In the accompanying drawing forming a part of this application, and in which like numerals are used to designate like parts throughout the same, Figure 1 is a fragmentary plan view of the eyeglasses provided with the coupling, according to the present invention;

Figure 2 is an elevational view of the coupling applied to eyeglasses;

Figure 3 is an enlarged fragmentary plan view of the glasses, with parts thereof broken away and in section;

Figure 4 is an enlarged sectional view taken on the line 4—4 of Figure 3;

Figure 5 is a perspective view of certain parts of the coupling;

Figure 6 is a perspective view showing the position of the parts when the coupling is assembled; and Figure 7 is a plan view, with parts broken away and in section, of a modified coupling.

Referring in detail to Figures 1 to 6 of the drawing, the numeral 20 designates a frame of a pair of eyeglasses, and supported by the frame 20 is a conventional lens 21. The present invention is directed to a coupling for hingedly connecting the temples 22 to opposite ends of the frame.

In constructing the coupling, the temple 22 and the frame 20 are each provided with a socket 23 which extends inwardly from an end thereof. Since the coupling consists of two (2) similar or identical parts connected together, only the part of the coupling which seats in the socket 23 of the frame 20 will be shown and described.

The socket 23 is substantially rectangular in shape and is preferably formed in the frame 20 during the molding thereof. The member or frame 20 is provided with a ledge or lip 24 adjacent the socket 23 and arranged between the lip 24 and the wall 25 is a plurality of spaced teeth or serrations 26. A hinge plate 27 provided with a plurality of spaced teeth 28 is seated in the socket 23 so that its teeth 28 mesh with or engage the teeth 26 of the member 20. A plurality of spaced parallel ears 29 project from the hinge plate 27 through the cut-out portion 31 in the member 20 and an aligned aperture 30 is arranged in each of the ears 29. After the hinge plate 27 is positioned in the socket 23, a slide bolt 32 is inserted into the socket, Figure 6, to maintain the teeth 28 and 26 in engagement with each other whereby the hinge plate will remain immobile.

In using the coupling of Figures 1 to 6, as previously stated, each of the members to be hingedly connected together, as for example the eyeglass frame 20 and the temple piece 22 are each provided with identical sockets 23. The slide bolt 32 is arranged so that its elongated portion holds the hinge plate 27 immobile in the socket. The slide bolt 32 is provided with a bent portion 19 which projects out of the socket whereby the slide bolt can be manually moved in and out of the socket so that the coupling can be readily assembled and disassembled. The hinge plate 27 is positioned in each socket, and the two hinge plates are arranged so that the ears 29 of one interfits between the ears of the other hinge plate. Then a suitable pivot pin 33 is passed through the registering apertures 30 whereby a pivotal connection is provided between the temple piece and frame. Although the coupling has been illustrated in use for eyeglasses, it is to be understood that the coupling can be used for hingedly connecting any two members together.

In the embodiment of Figure 7, the coupling has the same construction as the previously described coupling as shown in Figures 1 to 6, except that the hinge plate and member 20 are not provided with meshing teeth. Instead of the teeth arrangement, the member 20 is provided with a groove 34 which terminates or communicates with the socket 23. The hinge plate 35 carries a tongue 36 which seats in the groove 34 to prevent accidental movement of the hinge plate 35, and the slide bolt 32 is inserted in the socket 23 for retaining the tongue 36 positioned in the groove 34.

What we claim:

Eyeglasses comprising a frame, a temple piece, said frame and temple piece being each provided with a socket, a plurality of spaced teeth arranged in each of said sockets, a hingeplate seated in each of said sockets, each of said plates being provided with a plurality of spaced teeth arranged in engagement with the teeth in said socket, the teeth on said hinge plate extending along one longitudinal edge thereof for a portion of its length, a plurality of spaced parallel apertured ears projecting from each of said hinge plates, a pin pivotally connecting the ears of one plate to the ears of said other plate, and a slide bolt positioned in each of said sockets for maintaining the teeth of said plate in engagement with the teeth of said socket, said slide bolt abutting the other longitudinal edge of said hinge plate.

DAVID I. STEPACOFF.
PETER C. SMITH.

REFERENCES CITED

The following references are of record in the file of this patent:

UNITED STATES PATENTS

| Number    | Name    | Date          |
|-----------|---------|---------------|
| 1,291,360 | Babcock | Jan. 14, 1919 |
| 1,489,274 | Petty   | Apr. 8, 1924  |
| 1,650,576 | Welsh   | Nov. 22, 1927 |
| 1,687,960 | Welsh   | Oct. 16, 1928 |
| 2,109,520 | Awbrey  | Mar. 1, 1938  |